E. L. HALEY.
FISHING ROD.
APPLICATION FILED OCT. 4, 1917.

1,270,726.

Patented June 25, 1918.

WITNESSES
W. C. Fielding
Ross J. Woodward

INVENTOR
Edgar Lee Haley
BY Richard Bowen
ATTORNEY

UNITED STATES PATENT OFFICE.

EDGAR LEE HALEY, OF CROFTON, KENTUCKY.

FISHING-ROD.

1,270,726.
Specification of Letters Patent.
Patented June 25, 1918.

Application filed October 4, 1917. Serial No. 194,739.

*To all whom it may concern:*

Be it known that I, EDGAR L. HALEY, a citizen of the United States, residing at Crofton, in the county of Christian and State of Kentucky, have invented certain new and useful Improvements in Fishing-Rods, of which the following is a specification.

This invention relates to an improved fishing rod and the principal object of the invention is to provide a fishing rod so constructed that a fishing line may be unreeled a predetermined extent and to provide an improved latching means for preventing the reel from being rotated through the medium of a spring, means being further provided for releasing the latch and permitting the spring to rotate the reel and wind the line upon the reel.

Another object of the invention is to so construct this rod that the spring may be wound when the reel is rotated to unwind the line.

Another object of the invention is to so construct and mount the latch releasing means that this latch releasing means may be moved from a set position and permitted to move to release the latch when a fish bites and takes the hook carried by the line.

This invention is illustrated in the accompanying drawings, wherein:—

Figure 1:
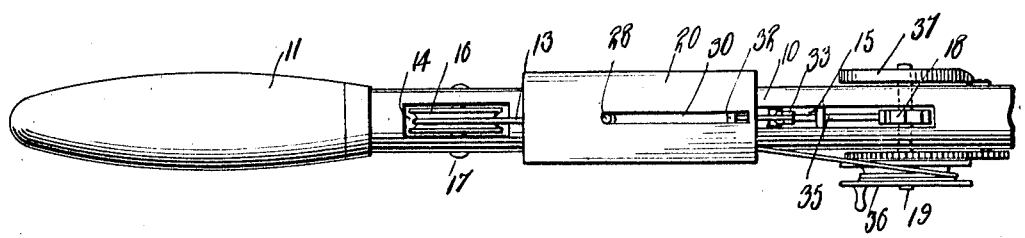
Figure 1 is a view showing the improved reel in top plan.

This rod 10 is provided with a handle or grip 11 and will be provided with one or more eyes 12 through which the fishing line 13 will pass. At a point adjacent the handle 11 there will be provided a slot forming a pocket 14 and at a point farther distant from the handle there will be provided a slot forming a pocket 15. Within the pocket 14 there will be provided a pulley wheel 16 rotatably mounted through the medium of the pin or axle 17 and within the pocket 15 there will be provided a ratchet wheel 18 rigidly mounted upon an axle 19.

Figure 2:
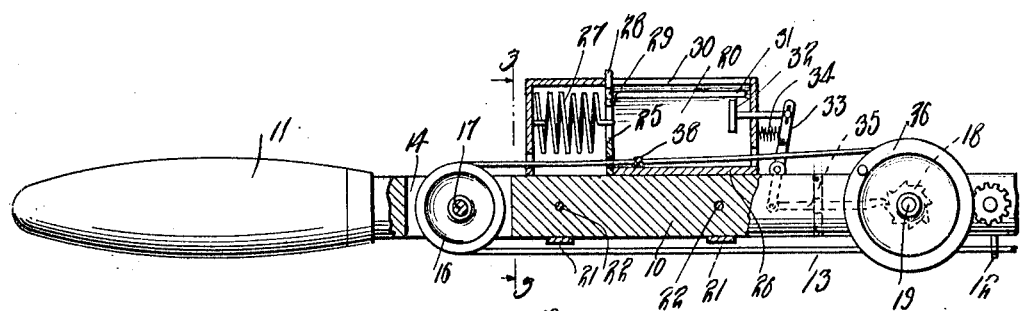
Fig. 2 is a view showing the improved fishing rod partially in side elevation and partially in section.
Figure 3:
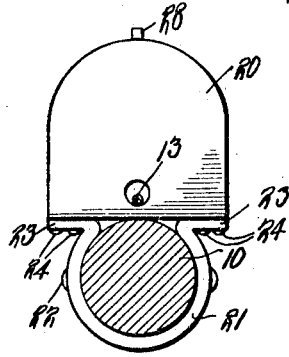
Fig. 3 is a transverse sectional view taken along the line 3—3 of Fig. 2.

A housing 20 is mounted upon the rod and is secured by the bands or collars 21 extending about the rod as shown in Fig. 3 and connected with the rod by a rivet 22 and provided with feet 23 secured to the bottom of the housing by rivets or other fasteners 24. A plate 25 is slidably mounted in the housing and when in a set position has its lower end engaging the abutment plate 26 thus preventing the spring 27 from moving the plate toward the forward end of the housing. This plate is guided in its sliding movement by pins 28 and 29 positioned in slots 30 and 31 and when moved forwardly by the spring will engage the plunger 32 thus moving the plunger outwardly and swinging the lever 33 against the action of the spring 34. This will cause the pawl 35 to be drawn rearwardly and out of engagement with the ratchet wheel 18 mounted upon the axle or shaft 19. The line 13 is wound upon a reel 36 rigid upon the shaft 19 and as this shaft is engaged by the coil spring 37, it will be readily seen that when the pawl moves out of engagement with the ratchet wheel, the spring in unwinding will rotate the reel and rewind the line upon the reel. In order to cause the abutment plate to be moved out of the set position, a knot 38 will be tied in the line at a predetermined distance from the end of the line. This knot will be positioned at approximately the point as shown in Fig. 2 when a line is in use and when the fish bites upon the line, the line will be moved rearwardly in the housing thus bringing the knot into engagement with the plate or abutment and moving the plate rearwardly. The action of the spring 27 will tilt the plate and will then move the plate forwardly until the plate engages the plunger 32 and moves the plunger to release the spring. The reel will then be wound to draw the line in.

What is claimed is:—

1. A fishing rod provided with slots, a housing carried by the rod between the slots, a guide rotatably mounted in one slot to the rear of the housing, a shaft rotatably carried by the rod and extending transversely thereof through the slot in front of the housing, a latch pivotally connected with the rod, a pawl carried by the shaft within the forward slot for engagement by the latch, a coil spring connected with the rod and with the shaft, a reel carried by the shaft, a plunger extending into the housing and having its outer end portion connected with the latch for moving the latch out of engagement with the ratchet wheel when the plunger is moved outwardly, an abutment movably mounted in the housing, means for releasably holding the abutment in a set position, resilient means engaging the abutment to move the same in the housing into engagement with the plunger to move the plunger outwardly, and a line wound upon the reel and passing through the housing and about the pulley in the rear slot, the line being provided with means for engaging the abutment to move the abutment out of a set position and permit the resilient means to move the abutment into engagement with the plunger.

2. A fishing rod, a housing carried by the rod, a reel having an axle rotatably connected with the rod, a spring engaging the axle to rotate the axle and reel carried thereby, a ratchet carried by the axle, a pawl normally engaging the ratchet, a plunger extending from the pawl into the housing, a piston slidably mounted in the housing and releasably held in a set position out of engagement with the plunger, resilient means engaging the piston to move the same into engagement with the plunger when moved from a set position, and means upon the line for engaging the piston to move the same from a set position when the line is moved rearwardly in the housing, the piston when released being moved forwardly by the resilient means to engage the plunger and move the latch to a releasing position to permit the spring to rotate the axle and reel to wind the line upon the reel.

3. A fishing rod, a reel, means for rotating the reel to wind a line thereon, latching means for releasably holding the reel against rotation with the line extended, means for moving the latch to an inoperative position, releasably held in an inoperative position, and means carried by the line for releasing the last mentioned means and permitting the same to move to release the latch.

4. A fishing rod, a reel carried thereby, means for rotating the reel, a latch for releasably holding the reel against rotation in one direction, and means for moving the latch to a releasing position releasably held in an inoperative position and automatically released for movement toward an operative position through the medium of an abutment carried by a line.

5. A fishing rod, a reel rotatably connected with the fishing rod, means for rotating the reel to wind a line thereon, a housing carried by the rod, means for releasably holding the reel against rotation to wind a line thereon including a plunger extending into the housing, and means in the housing for engaging the plunger to move the latching means to a releasing position, said last mentioned means being releasably held in an inoperative position and moved to an operative position for movement to engage the actuating plunger through the medium of an abutment carried by a line.

6. A fishing rod, a reel rotatably connected with the rod, means for rotating the reel to wind a line thereon, a housing carried by the rod, latching means for releasably holding the reel against rotation in one direction connected with the rod and including a plunger extending into the housing, and means in the housing for engaging the plunger to move the latch to a releasing position.

7. A fishing rod, a reel rotatably mounted thereon, means for rotating said reel in one direction, spring rewinding means operatively connected with the reel to rotate the same in the opposite direction, a latch normally holding the reel against the action of said rewinding means, means for releasing said latch, means for normally holding said releasing means inoperative, and means for releasing and actuating said first mentioned releasing means.

In testimony whereof I affix my signature in presence of two witnesses.

EDGAR LEE HALEY.

Witnesses:
T. H. LIKINS,
CLARA MARTIN.

Copies of this patent may be obtained for five cents each, by addressing the "Commissioner of Patents, Washington, D. C."